(12) United States Patent
Wong

(10) Patent No.: US 6,785,145 B1
(45) Date of Patent: Aug. 31, 2004

(54) COOLING DUCT FOR COMPUTER

(76) Inventor: Sidney S. Wong, 23203 W. Lone Tree La., Lake Zurich, IL (US) 60047-9064

( * ) Notice: Subject to any disclaimer, the term of this patent is extended or adjusted under 35 U.S.C. 154(b) by 0 days.

(21) Appl. No.: 10/613,311

(22) Filed: Jul. 7, 2003

(51) Int. Cl.[7] .................................................. H05K 5/06
(52) U.S. Cl. ....................... 361/752; 361/797; 361/800; 361/714
(58) Field of Search ................................. 361/752, 797, 361/800, 796, 724, 714, 686, 695, 690, 687

(56) References Cited

U.S. PATENT DOCUMENTS

| | | | | |
|---|---|---|---|---|
| 5,077,601 A | * | 12/1991 | Hatada et al. | 257/722 |
| 5,107,398 A | * | 4/1992 | Bailey | 361/687 |
| 5,917,698 A | * | 6/1999 | Viallet | 361/695 |
| 6,215,659 B1 | * | 4/2001 | Chen | 361/695 |

\* cited by examiner

Primary Examiner—Randy W. Gibson
Assistant Examiner—Hung Bui
(74) Attorney, Agent, or Firm—John L. Schmitt

(57) ABSTRACT

A duct, for channeling air from outside of a personal computer (PC) to cool a processor (CPU) of the PC, has a hollow body. This body comprises spaced apart sidewalls connected by an inner wall and an outer wall. In a lower section of the outer wall is an intake opening prepared to align with vent openings in an enclosure of the PC. As the walls of the body lower section extend upward, the side walls pinch inward to form a narrow top end. This narrow top end then connects with a narrow bottom end of an upper section of the body. The inner wall of the upper section arches inward while the outer wall flares upward. Inner end edges of the upper section walls define an outlet opening prepared to fit next to the processor. During operation, an intake fan of the CPU draws air through the duct that then discharges directly on the processor. This air flow may be enchanced by another fan unit carried in the duct upper section.

16 Claims, 3 Drawing Sheets

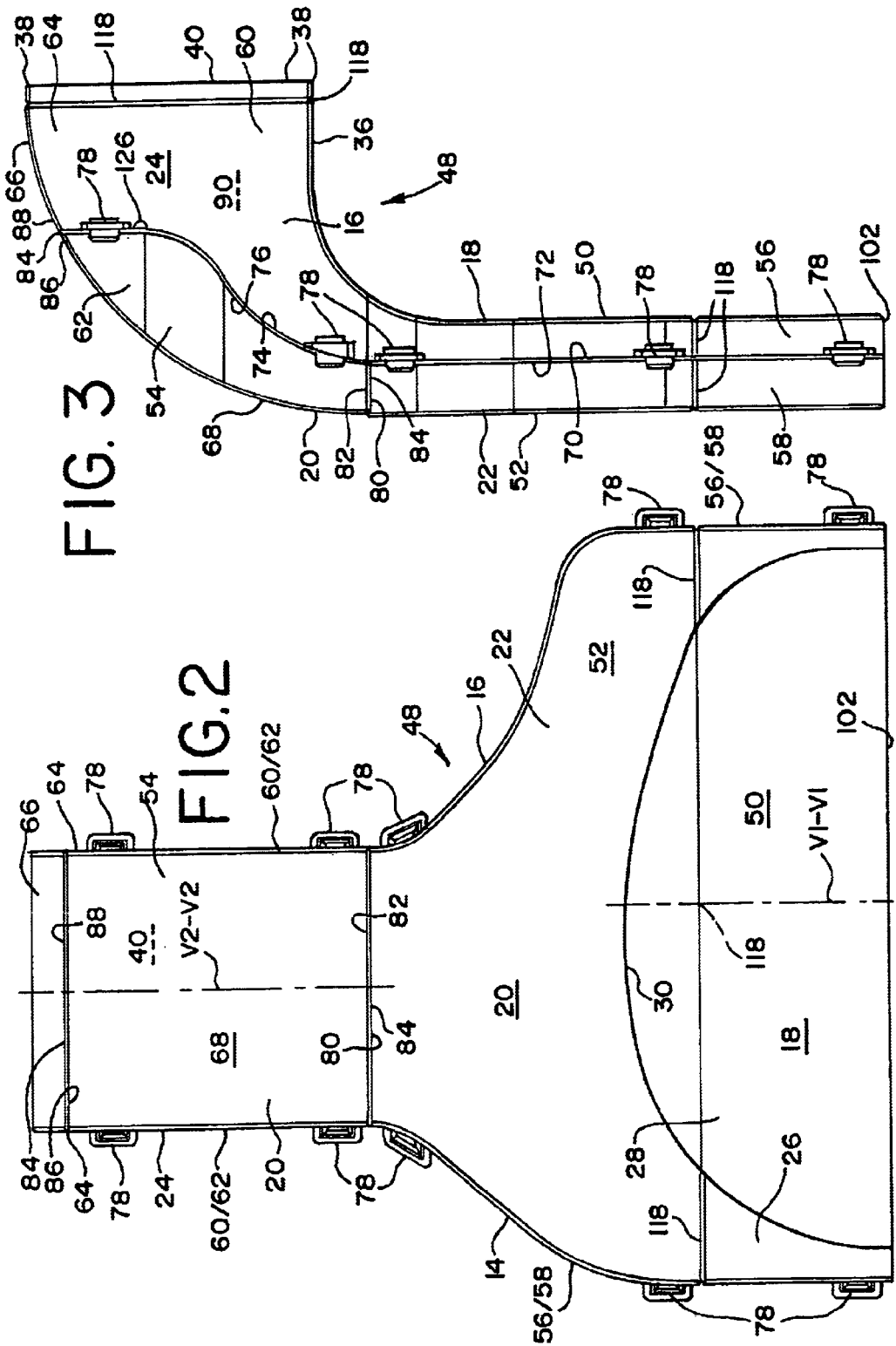

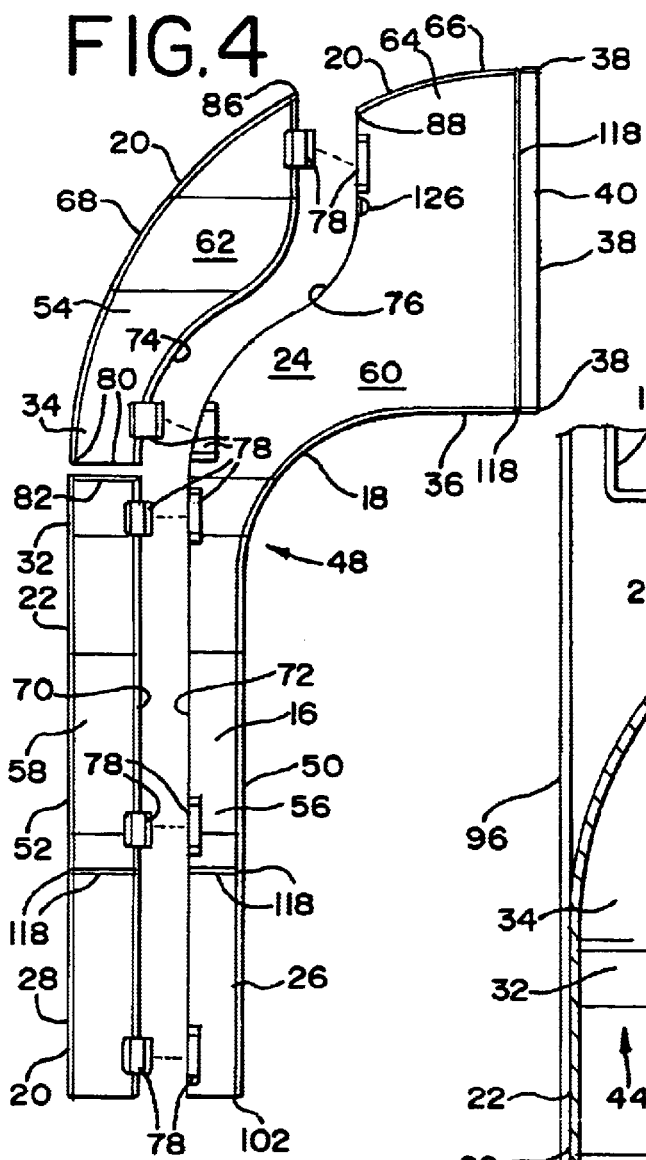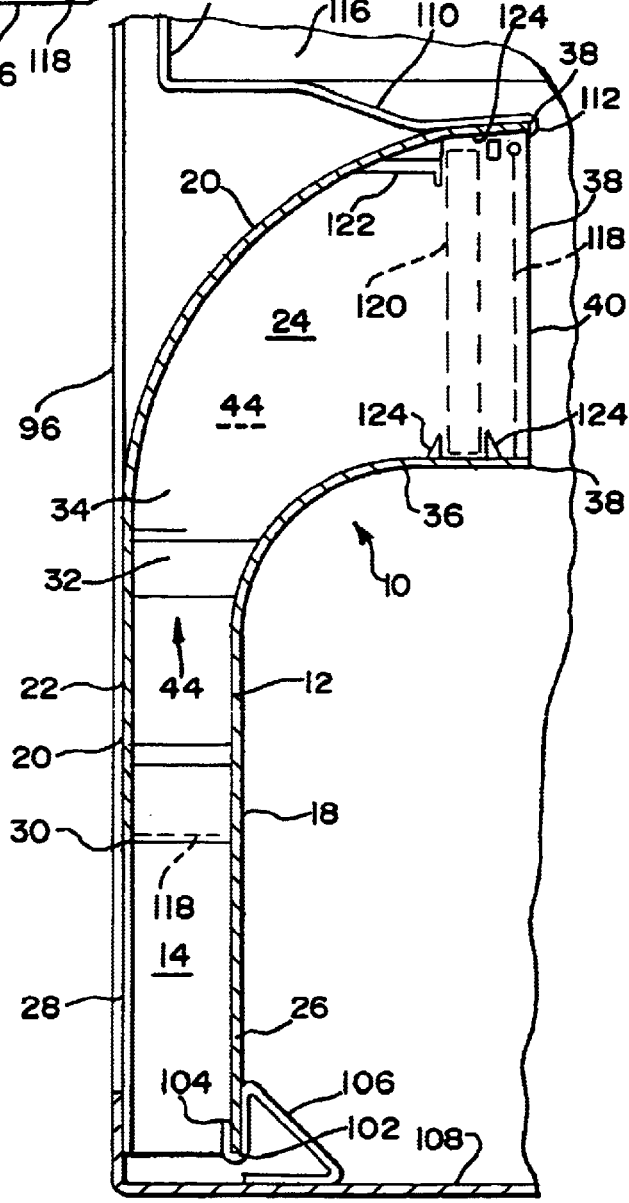

COOLING DUCT FOR COMPUTER

BACKGROUND OF THE INVENTION

1. Field of Invention

This invention relates to air ducting and more particularly to a duct for channeling air from outside an enclosure of a personal computer (PC) to a processor (CPU) of the computer ensuring that the operative temperature of the processor remains below that at which operation of the processor is adversely affected.

2. Prior Art

A need for heat management of operative components of computer systems has been well known for many years. For example, a large computer system typically is installed in a space having its own air-conditioning system with special ducting connected to various pieces of system equipment. Alternately, the enclosure of a personal computer (PC) typically includes one or two fans for drawing into and then exhausting air from an enclosure of the PC. With respect to such smaller computer systems, there often is a need to supplement built-in cooling to insure that excessive heat does not impede the operation of the CPU and other system components.

One example of a supplement cooling system for computers is disclosed in U.S. Pat. No. 5,107,398. This auxiliary system includes a pair of fan units installed inside a housing of the computer. A first fan unit draws air from a bottom inlet in the housing for discharge into a plenum having nozzles that direct the air onto electronic components in the housing. A second fan unit then draws this air over power supply units of the computer. An outlet of this second fan unit connects with an inlet section of a diffuser. This inlet section is defined by outwardly and downwardly diverging sidewalls connected by a top and bottom wall. An outer end of the inlet section then connects with a downwardly turned section having a bottom end outlet. This bottom outlet end connects with a plenum chamber of an exhaust fixture carried in an opening in a sidewall of the housing. Air discharges from the exhaust fixture through a set of vertically spaced apart, V-like shaped directional vanes.

Another cooling system for a computer is set out in U.S. Pat. No. 6,021,042. This cooling system includes redundant air moving units comprising a pair of spaced apart blower units located in an air moving chamber. Each blower unit discharges air into a mixing chamber defined in part by a top and bottom wall. Each wall is formed with an inward extending air director that restricts air flowing into the mixing chamber. Air discharging from the mixing chamber flows through a pair of spaced apart outlets in a sidewall of the chamber and then into a yoke-shaped diffuser having spaced apart outlets. Air from these diffuser outlets circulates over heat sink discs of the computer microprocessor.

U.S. Pat. No. 6,064,571 shows several fan duct modules particularly adapted to facilitate a flow of air to cool electronic components of a computer. One module includes an air guiding duct having an inlet end to receive air from outside the computer and a downwardly facing outlet end that connects with an upwardly facing intake of a blower. Air from the blower then discharges downward to flow over and cool electronic components below. A second duct module is designed to fit inside a wall of a computer chasse while a third module attaches to an outer sidewall of the computer chasse.

A still further heat dissipation enhancing device is set out in U.S. Pat. No. 6,163,453 and includes a fan duct having a cuboidal-like shape. In one sidewall of the duct is a discharge opening for an electric fan that pulls air from within the duct and then exhausts this air outwardly. Air enters the duct from a top opening located proximate a microprocessor of the computer and a rear side opening located proximate to a power supply of the computer. Alternatively, the top opening in the duct may be replaced by an arcuate-shaped top wall protrusion having a rectangular, vertically positioned front opening. Initial fan discharge may be increased by the duct including an extension chamber aligned with the fan.

Computer cooling systems also may combine air cooling with liquid-base cooling. For example, U.S. Pat. No. 6,343,378 discloses a dual water-air cooling arrangement for a microprocessor of a computer. Positioned above the computer microprocessor is a heat sink having fins to receive beat transferring from the microprocessor to the heat sink. These fins release this heat to a stream of air from a fain unit located just above the fins and to coolant circulating in piping extending through the fins.

Lastly, computer cooling units may include air diffusers having spaced apart fins to channel the flow of air through diffusers, see U.S. Pat. Nos. 6,256,197 and 6,333,852.

SUMMARY OF THE INVENTION

A duct, particularly adapted for channeling air from outside of an enclosure of a personal computer (PC) to cool a processor (CPU) of the PC, has a hollow body. This body is defined by spaced apart sidewalls that are connected by an inner wall and an outer wall to form an interior passageway through the duct body. In a lower section of the outer wall of the duct body is an enlarged intake opening prepared to align with vent openings in a side panel of an enclosure of the PC. As the walls of the lower section of the duct body extend upward, the sidewalls pinch inward to form a narrow top end. This lower section narrow top end then connects with a narrow bottom end of an upper section of the duct body. The inner wall of the upper section arches inward while the outer wall of the upper section flares upward. Inner end edges of the walls of the upper section define a vertically positioned outlet opening prepared to locate next to the processor.

For use, first the side panel of the PC enclosure is removed so that the cooling duct may be placed inside the enclosure. The duct is positioned inside the enclosure so that the intake opening in the duct lower section locates adjacent to the vent openings in the reinstalled enclosure side panel and the outlet opening in the duct upper section faces an integrally formed heat sink of the processor. With the PC enclosure again reassembled and the PC is energized, the CPU intake fan draws ambient air from outside enclosure through the side panel vent openings. A portion of this air flows through the duct interior passageway to discharge directly on the heat sink of the processor to insure that the temperature of the processor remains in its optimum operative range.

The duct of this invention provides several advantages over computer air cooling ducts known or in use.

A first advantage is that a further fan unit may be installed in the upper section of the duct to enhance the volume of air discharging from the duct onto the processor heat sink. This supplemental volume of cooling air may be needed where the PC operates in a non air-conditioned environment or the configuration of vent openings is based more aesthetics than function.

A second advantage is that the duct may be made in three pieces, an inner portion, an upper cover, and a lower cover.

The three-piece duct has reduced tooling costs allowing this duct to be sold at a more competitive price. Also, the pieces comprising this duct may be more compactly packaged for shipping. As required, these pieces may be readily snapped together or disassembled.

The three-piece duct is particularly adaptable, an important feature since the PC enclosure side panel vent openings-processor relationship varies depending on the particular PC. Additionally, a PC enclosure may contain sound proofing material. For example, where the transverse distance between the enclosure side panel and the computer processor is limited, just the duct inner portion need be used. In this case, side edges of sidewall parts of the duct inner portion are positioned against an inside surface of the PC enclosure side panel. Another example is where the enclosure side panel vent openings do not operatively align with the duct intake opening. In this case, the duct may be installed without a lower cover thereby enlarging the duct intake opening.

Finally, walls of the duct lower section and duct upper section may be formed with trim lines allowing severance of fragments of the duct. Upon severance of part of the duct lower section, the vertical distance between the duct intake and outlet openings is reduced. Removal of a fragmentary part of the duct upper section reduces the transverse distance between the intake and outlet openings.

DESCRIPTION OF THE DRAWING FIGURES

FIG. 2 is a front elevation view of a three-piece embodiment of the duct of this invention.

FIG. 3 is a side elevation view of the duct of FIG. 2.

FIG. 4 is a side elevation view of the duct of FIG. 2 showing a lower cover and an upper cover of the duct disassembled from an inner portion of the duct.

FIG. 5 is a cross-sectional view as seen generally along the line 5—5 of FIG. 1.

DESCRIPTION OF THE PREFERRED EMBODIMENT

Figure 1:
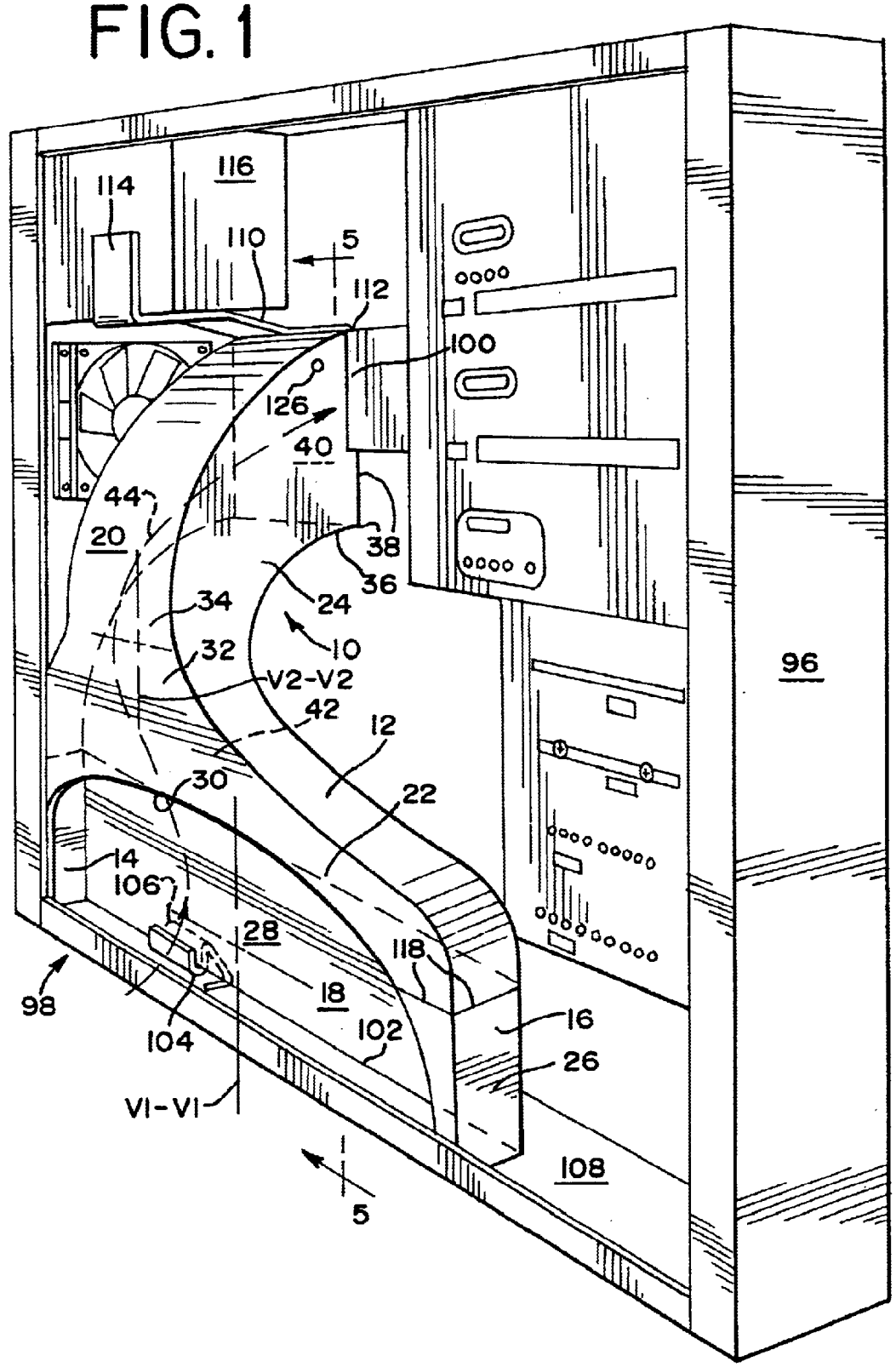
FIG. 1 is a perspective view showing an enclosure of a computer enclosure having a side panel removed for installation of a duct of this invention.

The duct of this invention is shown generally in FIGS. 1 and 2 and designated 10. The duct 10 has a hollow one-piece body 12. This body 12 is defined by spaced apart sidewalls 14, 16 that are connected by an inner wall 18 and an outer wall 20 to form a lower section 22 and an upper section 24. The lower section 22 has an enlarged bottom end 26. The outer wall 20 of the lower section enlarged bottom end 26 is formed with an intake opening 28 having an arcuate-shaped upper edge 30. As the walls 14–20 of the body lower section 22 extend upward, the sidewalls 14, 16 pinch inward to form a narrow top end 32.

The top end 32 of the duct body lower section 22 connects with a narrow bottom end 34 of the duct body upper section 24. The inner wall 18 of the upper section 24 arches inward so that an inner end segment 36 of the inner wall 18 is substantially horizontal. The outer wall 20 of the upper section 24 expands upward. Inner end edges 38 of the upper section sidewalls 14, 16 and inner and outer wall 18, 20 define a vertically positioned, square-like shaped outlet opening 40. Note that the degree of convergence of the sidewall 16 is greater than that of the sidewall 14 so that centerline V1—V1 of the intake opening 28 is laterally offset from centerline V2—V2 of the lower section top end 32, the upper section bottom end 34, and the outlet opening 40. As defined above, the duct 10 has a rectangular-like cross sectionally shaped interior passageway 42 where a cross section of the lower section enlarged bottom end 26 is substantially larger than a cross section of the lower section narrow top end 32, and the outlet opening 40 is at least twice as large as the cross section of the upper section narrow bottom end 34. As seen in FIG. 1, this interior passageway 42 provides a flow path 44 having a laterally shifting, S-like shape.

As seen in FIGS. 2–4, a further embodiment of the duct of this invention is shown and designated 48. Where the duct 48 includes structural elements like those of the duct 10, like reference numbers are used to identify these like elements. The duct 48 comprises three pieces-an inner portion 50, a lower cover 52, and an upper cover 54. In this case, the sidewalls 14, 16 are divided into lower section inner parts 56, lower section outer parts 58, upper section inner parts 60, and upper section outer parts 62. The inner portion 50 of the duct 48 includes the joined lower and upper section sidewall inner parts 56, 60 that are connected by the inner wall 18. Additionally, top ends 64 of the upper section sidewall inner parts 60 are connected by an inner end segment 66 of the outer wall 20.

The lower cover 52 includes the lower section sidewall outer parts 58 that are connected by the lower section 22 of the outer wall 20. This outer wall lower section 22 is formed with a like intake opening 28.

The upper cover 54 includes the upper section sidewall outer parts 62. These sidewall outer parts 62 then are connected by a lower end segment 68 of the upper section 24 of the outer wall 20.

The lower cover 52 is assembled to the lower section 22 of the inner portion 50 by aligning respective side edges 70 of the lower cover sidewall outer parts 58 with the side edges 72 of the lower section sidewall inner parts 56 of the inner portion 50. The lower cover 52 then is held in place by snapping together six pairs of spaced apart clip sets 78 that are attached respectively to the sidewall inner and outer parts 56, 58 of the inner portion lower section 22 and the lower cover 52.

The upper cover 54 is assembled to the upper section 24 of the inner portion 50 by aligning side edges 74 of the upper cover sidewall outer parts 62 with side edges 76 of the upper section sidewall inner parts 60 of the inner portion 50. Note that these upper section inner and outer part side edges 74, 76 have S-like complementary shapes. Similar to the lower cover 52, the upper cover 54 is secured in place by snapping together four pairs of spaced apart clip sets 78 that are attached respectively to the sidewall inner and outer parts 60, 62 of the inner portion upper section 24 and the upper cover 54.

As secured, bottom end edges 80 of the upper cover outer wall lower end segment 68 and the sidewall outer parts 62 respectively engage top end edges 82 of the lower cover outer wall 20 and the lower cover sidewall outer parts 58 to form a seal-like fit 84. At the same time, a top end edge 86 and the side edges 74 of the upper cover 54 form like fits 84 respectively with an outer end edge 88 of the inner end segment 66 of the inner portion upper section outer wall 20 and with side edges 76 of the inner portion upper section sidewall inner parts 60. Lastly, the side edges 70 of the lower cover 52 seal against the side edges 72 of the inner portion sidewall inner parts 56. Like the duct 10, once the duct 48 is assembled, the duct 48 has a rectangular-like cross sectionally shaped interior passageway 90 that extends from the intake opening 24 to the outlet opening 40.

For use, first a side panel (not shown) of an enclosure 96 of a personal computer 98 is removed, see FIGS. 1 and 5. The duct 10 (or duct 48) then is placed inside the enclosure 96 so that the outlet opening 40 of the duct upper section 24 aligns with the computer processor and its integrally formed heat sink 100. As positioned, the intake opening 28 of the duct lower section 22 is positioned to align with vent openings in the enclosure side panel when this panel is reinstalled. To hold the duct 110 in place, a bottom edge 102 of the inner wall 18 of the duct lower section 22 is placed in a U-shaped slot 104 of a retaining clip 106 secured to a bottom panel 108 of the enclosure 96 by a VELCRO-type pad set (not shown). Concurrently, the upper section 24 of the duct 10 is secured by a retaining strap 110 having a U-shaped flange 112 that fits over the inner end edge 38 of the upper section outer wail 20. A flanged outer end 114 of the strap 110 then is fitted over a box 116 containing the power supply of the computer 98, for example. The strap outer end 114 is held in place by another VELCRO-type pad set (not shown). On an outer end of the strap U-shaped flange 112 is a rib 128. Depending on the exact location of the box 116, the rib 128 of the strap 110 selectively fits between two of several spaced apart ridges 130 formed as part of the duct upper section outer wall 20, see FIG. 5.

Note that the sidewall, inner wall, and outer wall 14–20 of the lower section 22 and the walls 14–20 of the upper section 24 of the ducts 10, 48 are formed with V-shaped trim lines 118. These lines 118 allow the enlarged bottom end 26 of the duct lower section 22 or a small fragment of an outlet end of the duct upper section 24 to be severed from the duct body 12 when it is necessary to reduce the size of the duct body 12.

Additionally, the size of the inlet opening 28 in the duct lower section 22 may be increased by installing the duct 48 without the lower cover 52. Further, the inner portion 50 (see FIG. 4) of the duct 48 may be installed without either cover 52, 54. In this case, the side edges 72 of the inner portion lower section sidewall inner pats 56 seat against an inside of the enclosure side panel. As so configured, the inner portion 50 not only has an enlarged inlet opening 28 but its transverse dimension is further reduced. Configuring the duct 48 to have an enlarged intake opening 28 may be necessary to insure operative alignment between the duct intake opening 28 and the vent openings of a particular PC enclosure side panel.

As seen in FIG. 5, a fan unit 120 has been installed in the upper section 24 of the duct 10 where this fan unit 120 is seated on the inner end segment 36 of the inner wall 18. Note that in a like manner this fan unit 120 also may be installed in the duct 48. In either case, a top of the fan unit 120 is held in place by a pair of spaced apart stop brackets 122 formed as part of the outer wall 20. A base of the fan unit 120 locates between two pairs of spaced apart ribs 124 formed as part of the inner end segment 36 of the inner wall 18. The preferred fan unit 120 produces an air flow rate of about 20–30 CFM. The fan unit 120 operates on a 12-volt electric power supply made available by connecting the fan unit 120 to terminals on a motherboard of the computer 98. Leads from the fan unit 120 (not shown) extend through an opening 126 in the duct sidewall 16. Without the fan unit 120, the ducts 10, 48 effect a 3–5 deg. C. reduction in average operating temperature of the processor 100. With the fan unit 120 operating, cooling of the processor 100 increases another 2 deg. C. Where only the inner portion 50 is installed for ducting air, installation of a fan unit 120 is recommended.

While embodiments, uses, and advantages of this invention have been shown and discussed, it should be understood that this invention is limited only by the scope of the claims. Those skilled in the art will appreciate that various modifications and changes may be made without departing from the scope and spirit of the invention, and these modifications and changes may result in further uses and advantages.

What is claimed is:

1. A duct particularity adapted for channeling a flow of cooling air to a heat sink of a processor of a personal computer, said duct comprising:

a body having spaced apart sidewalls connected by an inner wall and an outer wall to define an interior passageway forming a S-like shaped flow path through said body, a lower section of said body having an enlarged bottom end formed with an intake opening in said outer wall and a narrow top end formed as said walls of said lower section extend upward while said sidewalls of said lower section converge inward with a cross section of said bottom end being substantially larger than a cross section of said narrow top end, and an upper section of said body having a narrow bottom end connecting with said narrow top end of said lower section with said inner wall of said upper section arching inward and said outer wall of said upper section diverging upward so that inner end edges of said walls of said upper section define an outlet opening having a cross section about twice as large as a cross section of said upper section narrow bottom end, wherein for use, said duct is placed inside an enclosure of said personal computer so that said intake opening of said duct is positioned adjacent to vent openings in a side panel of said enclosure and said outlet opening of said duct is positioned adjacent to said processor heat sink, and air being drawn into said enclosure through said vent openings flows directly through said duct interior passageway to said processor heat sink.

2. A duct as defined by claim 1 and further characterized by, a centerline of said intake opening of said duct being laterally offset from a centerline of said outlet opening of said duct.

3. A duct as defined by claim 1 and further characterized by, said walls of said duct lower section and said upper section being formed respectively with V-like shaped trim lines, wherein said trim lines promote ready deduction in size of said duct.

4. A duct as defined by claim 1 and further characterized by, said duct lower section having a bottom edge fitting in a slot of a retaining clip prepared to be secured to said enclosure.

5. A duct as defined by claim 1 and further characterized by, said duct upper section outer wall inner end edge fitting in a U-shaped flange of a retaining strap having a flanged outer end prepared to be secured to said computer.

6. A duct as defined by claim 1 and further characterized by, said duct upper section prepared for installation of a fan unit by including a pair of stop brackets and pairs of spaced apart ribs formed as part of said duct walls.

7. A duct as defined by claim 6 and further characterized by including, a fan unit installed in said duct upper section.

8. A duct particularity adapted for channeling a flow of cooling air to a heat sink of a processor of a personal computer, said duct comprising:

a body having spaced apart sidewalls connected by an inner wall and an outer wall to define an interior passageway through said body, a lower section of said body having an enlarged bottom end formed with an intake opening in said outer wall and a narrow top end formed as said walls of said lower section extend upward while said sidewalls of said lower section converge inward, and an upper section of said body having a narrow bottom end connecting with said narrow top end of said lower section with said inner wall of said upper section arching inward and said outer wall of said upper section diverging upward so that inner end edges of said walls of said upper section define an outlet opening, said sidewalls of said lower section being divided into separate inner and outer parts, said sidewalls of said upper section being divided into separate inner and upper parts, and said outer wall being divided into a separate lower section, a separate upper section lower end segment, and a separate upper section inner end segment, an inner portion comprising said separate lower section and said separate upper section sidewall inner parts being respectively joined and connected by said inner wall, and top ends of said separate upper section sidewall inner parts connected by said separate inner end segment of said outer wall, a lower cover comprising said separate lower section sidewall outer parts connected by said separate lower section of said outer wall, an upper cover comprising said separate upper section sidewall outer parts connected by said separate lower end segment of said outer wall, and spaced apart clip sets attached respectively to said sidewall inner parts of said inner portion, said separate sidewall outer parts of said lower cover and said upper cover, wherein for use, said covers may be attached to said duct inner portion to form said interior passageway between said intake opening and said outlet opening, and then said duct is placed inside an enclosure of said personal computer so that said intake opening of said duct is positioned adjacent to vent openings in a side panel of said enclosure and said outlet opening of said duct is positioned adjacent to said processor heat sink, and air being drawn into said enclosure through said vent openings flows directly through said duct interior passageway to said processor heat sink.

9. A duct as defined by claim 8 and further characterized, bottom end edges of said upper cover forming a seal-like fits with top end edges of said lower cover, side edges of said upper cover forming seal-like fits with side edges of said inner portion upper section sidewall inner parts, a top end edge of said upper cover outer wall lower end segment forming a seal-like fit with an outer end edge of said inner portion outer wall inner end segment, and side edges of said lower cover forming seal-like fits with said side edges of said inner portion separate lower section sidewall parts.

10. A duct as defined by claim 8 and further characterized by, side edges of said inner portion upper section sidewall inner parts and said side edges of said upper cover sidewall outer parts having respective complementary S-like shapes.

11. A duct for installation inside an enclosure of a personal computer to channel air from outside said enclosure to a heat sink of a processor of said computer, said duct comprising:

an inner portion including spaced apart sidewall inner parts connected by an inner wall, said sidewall inner parts and said inner wall forming a lower section and an upper section, said lower section having an enlarged bottom end with said inner wall and said sidewalls inner parts of said lower section extending upward and said lower section sidewall inner parts converging inward to form a narrow top end that connects with a narrow bottom end of said upper section, said inner wall of said upper section aching inward and said sidewall inner parts of said upper section extending upward, and said upper section having an outlet opening defined by an inner end edge of said upper section inner wall, inner edges of said upper section sidewall inner parts, and an inner edge of an inner end segment of an outer wall that connects top ends of said upper section sidewall inner parts, a lower cover prepared for assembly to said lower section of said inner portion, said lower cover including spaced apart sidewall outer parts connected by a lower section of said outer wall with said lower cover having an enlarged bottom end formed with an intake opening, an upper cover prepared for assembly to said upper section of said inner portion, said upper cover including spaced apart sidewall outer parts connected by a lower end segment of said outer wall, and spaced apart clip sets attached respectively to said inner portion sidewall inner parts and to said sidewall outer parts of said lower cover and said upper cover, wherein for assembly, side edges of said lower cover sidewall outer parts are aligned with side edges of said inner portion lower section sidewall inner parts and then said lower cover is held in place by joinder of said clips sets carried by said lower cover and said lower section of said inner portion, and side edges of said upper cover sidewall outer parts are aligned with side edges of said inner portion upper section sidewall inner parts, a top end edge of said upper cover outer wall lower end segment is aligned with an outer end edge of said inner portion upper section outer wall inner end segment, bottom end edges of said upper cover outer wall lower end segment is aligned with top end edges of said lower cover, and then said upper cover is held in place by joinder of said clips sets carried by said sidewall inner and outer parts of said upper cover and said upper section of said inner portion.

12. A duct for installation inside an enclosure of a personal computer to channel air from outside said computer to a heat sink of a processor of said computer, said duct comprising an inner portion including:

spaced apart sidewalls inner parts connected by an inner wall to form a lower section and an upper section, said lower section having an enlarged bottom end with said inner wall and said sidewalls inner parts of said lower section extending upward and said lower section sidewalls inner parts converging inward to form a narrow top end that connects with a narrow bottom end of said upper section, and said inner wall of said upper section arching inward and said sidewalls inner parts of said upper section extending upward so that an inner end edge of said upper section inner wall, inner end edges of said upper section sidewall inner parts, and an inner end edge of an outer end segment of a top wall attached to top ends of said upper section sidewall inner parts define an outlet opening, wherein for use, side edges of said lower section sidewall inner parts are seated against an inside surface of a side panel of an enclosure of said computer so that said lower section of said inner portion operatively aligns with vent openings in said side panel.

13. A duct as defined by claim 12 and further characterized by said duct including, a lower cover prepared for attachment to said lower section of said inner portion and as attached to form a seal-like fit with said lower section of said inner portion, and an upper cover prepared for attachment to said upper section of said inner portion and as attached to form a seal-like fit with said inner portion upper section and said lower cover.

14. A duct as defined by claim 12 and further characterized by said duct including, a fan unit carried in said upper section of said inner portion.

15. A duct as defined by claim 14 and further characterized by including, a pair of stop brackets and a pair of spaced apart ribs formed as part of said inner portion upper section walls for securing a location of said fan unit.

16. A duct as defined by claim 12 and further characterized by, said inner wall and said sidewall inner parts of said inner portion lower section and said inner wall, said sidewall inner parts, and said inner end segments of said outer wall of said inner portion upper section being formed with trim lines, wherein said trim lines promote ready deduction in size of said duct inner portion.

\* \* \* \* \*